(No Model.)

A. BEARD.
ROTARY ENGINE.

No. 433,847. Patented Aug. 5, 1890.

WITNESSES:
H. L. Ourand.
Jo. L. Coombs.

INVENTOR:
Andrew Beard,
by Sacus Pagger & Co.,
Attorneys.

THE NORRIS PETERS CO., PHOTO-LITHO., WASHINGTON, D. C.

UNITED STATES PATENT OFFICE.

ANDREW BEARD, OF WOODLAWN, ALABAMA.

ROTARY ENGINE.

SPECIFICATION forming part of Letters Patent No. 433,847, dated August 5, 1890.

Application filed June 12, 1890. Serial No. 355,181. (No model.)

*To all whom it may concern:*

Be it known that I, ANDREW BEARD, a citizen of the United States, and a resident of Woodlawn, in the county of Jefferson and State of Alabama, have invented certain new and useful Improvements in Rotary Engines; and I do hereby declare that the following is a full, clear, and exact description of the invention, which will enable others skilled in the art to which it appertains to make and use the same, reference being had to the accompanying drawings, which form a part of this specification.

My invention relates to improvements in rotary engines of that class in which a piston wheel or hub fixed to a driving-shaft revolves within an annular chamber, said piston-wheel being provided with buckets pivoted in recesses in the periphery thereof, which buckets are operated by the revolution of the piston-wheel.

The object of my invention is to provide a cheap, simple, and efficient engine of the character above named, in which the buckets are actuated so as to bring them into position to be operated upon by the steam by means of sliding plates having pins which engage with the buckets, said plates being actuated by means of a stud or pin on one of the inner faces of the engine-casing, which comes in contact with a cam-face on said plates during the revolution of the piston-wheel, to which said plates are movably attached.

The invention consists in the novel construction and combination of parts, hereinafter fully described, and definitely pointed out in the claim.

Figure 1:
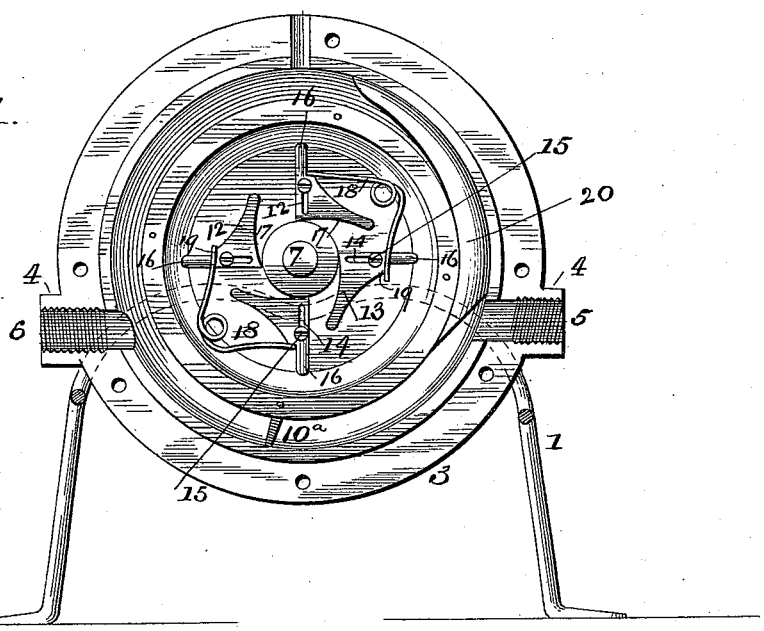
Figure 2:
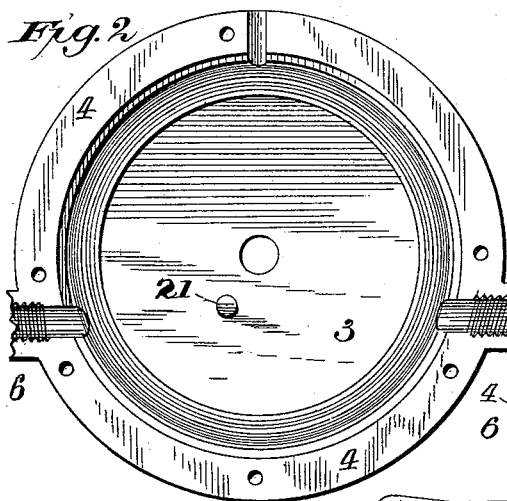
Figure 3:
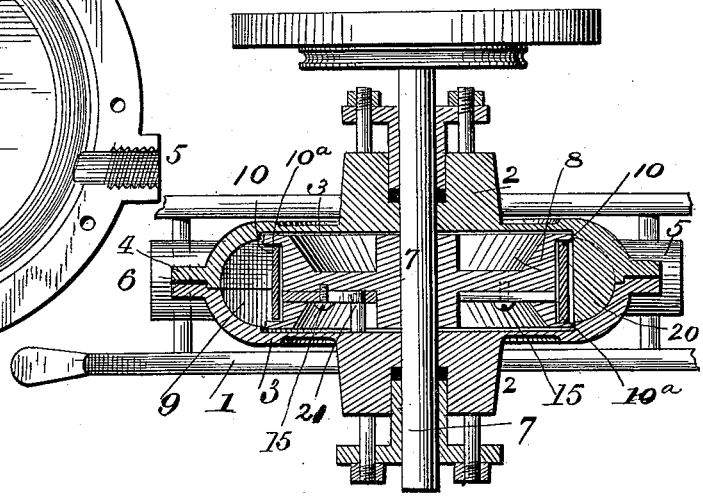

In the accompanying drawings, Figure 1 is a side elevation of a rotary engine embodying my improvements, one of the sides of the casing being removed. Fig. 2 is an inside view of one of the halves of the casing, showing the stud or pin which actuates the plates for operating the buckets or pistons. Fig. 3 is a horizontal sectional view.

In the said drawings, the reference-numeral 1 designates the bed or frame, upon which the engine is supported by means of the hubs 2 on the casing which rests on said bed.

The numeral 3 designates the walls of the casing, consisting of two recessed annular disks provided with rims or flanges 4, by which they may be bolted together, a suitable packing being interposed for the purpose of forming a tight joint. When so placed together, an annular steam-chamber is formed provided with a steam-inlet port 5 and an outlet or eduction port 6. Passing centrally through this casing and through the hubs thereof is a driving-shaft 7, capable of freely revolving in said hubs, which form its bearing. Firmly secured to this shaft, so as to revolve therewith, is the wheel or hub 8, consisting of an annular disk recessed upon one of its faces to receive the plates which operate the buckets. This disk is somewhat smaller in diameter than the interior of the casing, so that when inserted therein an annular steam-space 9 will be formed. The periphery of the disk is provided with a series of recesses 10, corresponding in number to the number of buckets or pistons employed. These pistons or buckets consist of flat metal plates $10^a$, pivoted at one end in these recesses in such manner as to be readily folded up, so as to be flush with the periphery of the wheel when not being operated upon by the steam, and to be readily made to assume a position at right angles thereto when they shall have passed the steam-inlet and are to be operated upon by the steam. The number of these pistons or buckets may vary according as is desired, in the present instance four being shown.

In the annular recess in the face of the piston wheel or disks are secured the plates 12 for actuating said buckets. They consist of a triangularly-shaped body portion 13, having a slot 14, through which passes a headed screw or bolt 15. The head of this bolt presses loosely upon this body portion, so that the latter may reciprocate freely. At their outer ends these plates are provided with pins 16, which project through the periphery of the wheel or hub, so as to contact with the pistons or buckets. The inner faces 17 of these plates are curved or beveled, so as to form a cam-surface, which engages with a stud or pin on the casing, whereby said plates in the revolution of the wheel or hub will be actuated or forced outwardly, so as to bring the pistons or buckets into operative position.

The numeral 18 designates a spring for withdrawing the plates after the pistons have been expanded, and consists of a piece of spring-wire coiled at its center and secured to the piston-wheel with its ends resting against the shoulders 19 of two adjoining plates.

The numeral 20 designates wings or flanges located in the steam-space 9, commencing at or about the steam-inlet and extending around the casing for about one-fourth (more or less) of its circumference, at which point it is beveled, as seen in Fig. 1. On the inner surface of one of the walls of the casing is provided a stud or pin 21, so located with respect to the plates 12 that just as the pistons or buckets come opposite to the steam-inlet opening said pin will strike the cam-faces 17 and force the plates outward, so that the pins 16 will expand the pistons or buckets. As the disk revolves, the buckets will come in contact with the beveled wing or flange 20, when they will be folded up, and be again expanded when they reach the steam-inlet. The springs 18 withdraw the plates and pins after they have expanded the pistons, one spring serving to actuate two of the plates.

Having thus described my invention, what I claim is—

In a rotary engine, the combination, with the casing having steam inlet and outlet, the driving-shaft, the annularly-recessed piston-wheel, and the beveled wing or flange located in the steam-space, of the pistons or buckets pivoted in recesses in the periphery of the piston-wheel, the sliding plates having pins and cam-faces located in the recess in the face of the piston-wheel, the springs coiled at their centers and secured to the piston-wheel with their ends bearing against the adjoining plates, and a stud or pin on the inner face of the casing adapted to engage with the cam-surfaces of said plates during the revolution of the piston-wheel, substantially as described.

In testimony that I claim the foregoing as my own I have hereunto affixed my signature in presence of two witnesses.

ANDREW BEARD.

Witnesses:
 LOUIS BAGGER,
 WM. F. FOLKS.